Nov. 10, 1936.  D. L. SUMMEY  2,060,135
METALLURGICAL APPARATUS
Original Filed April 29, 1932  10 Sheets-Sheet 1
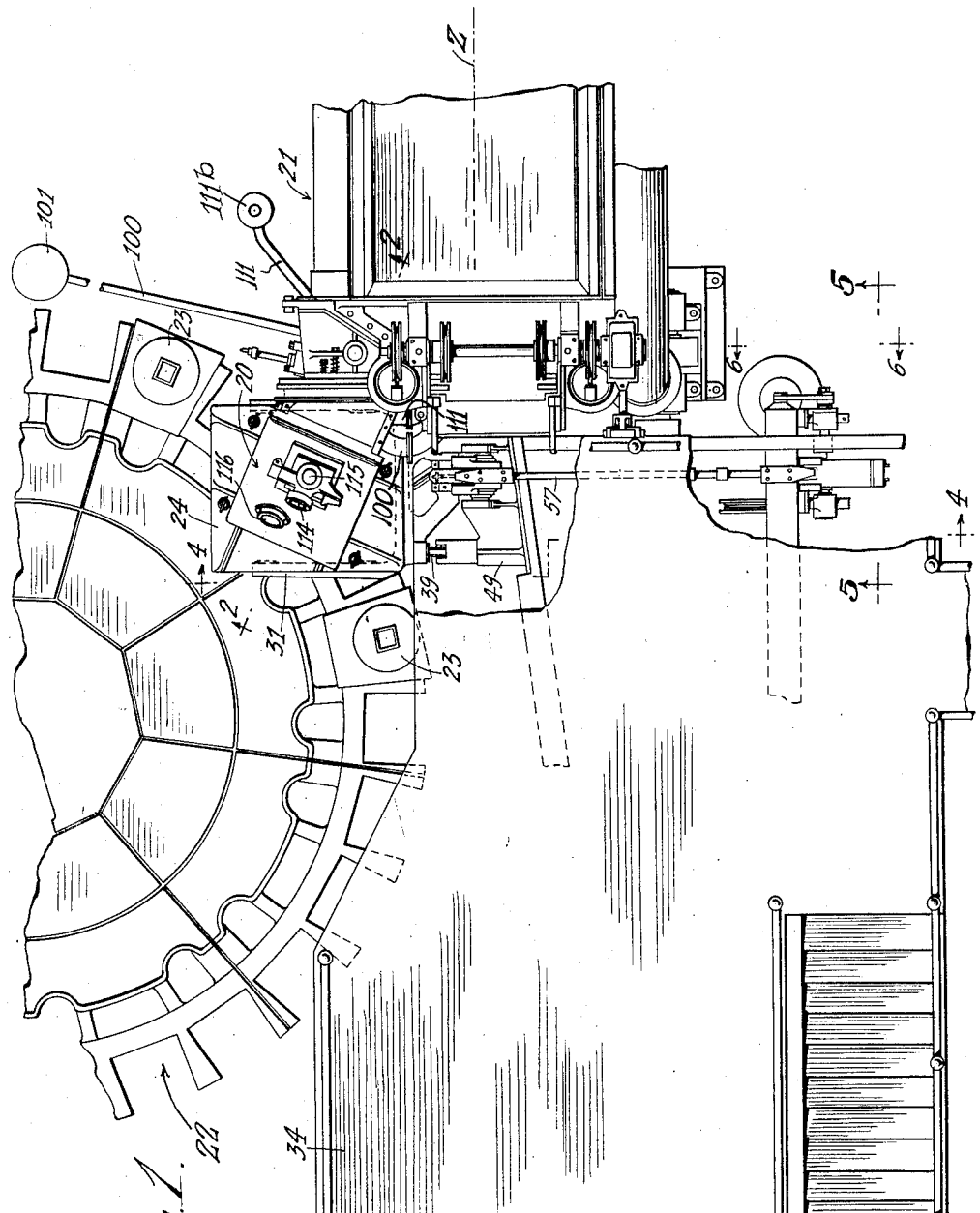
INVENTOR
DAVID L. SUMMEY.
BY
Emery, Booth, Varney & Whittemore
ATTORNEYS.

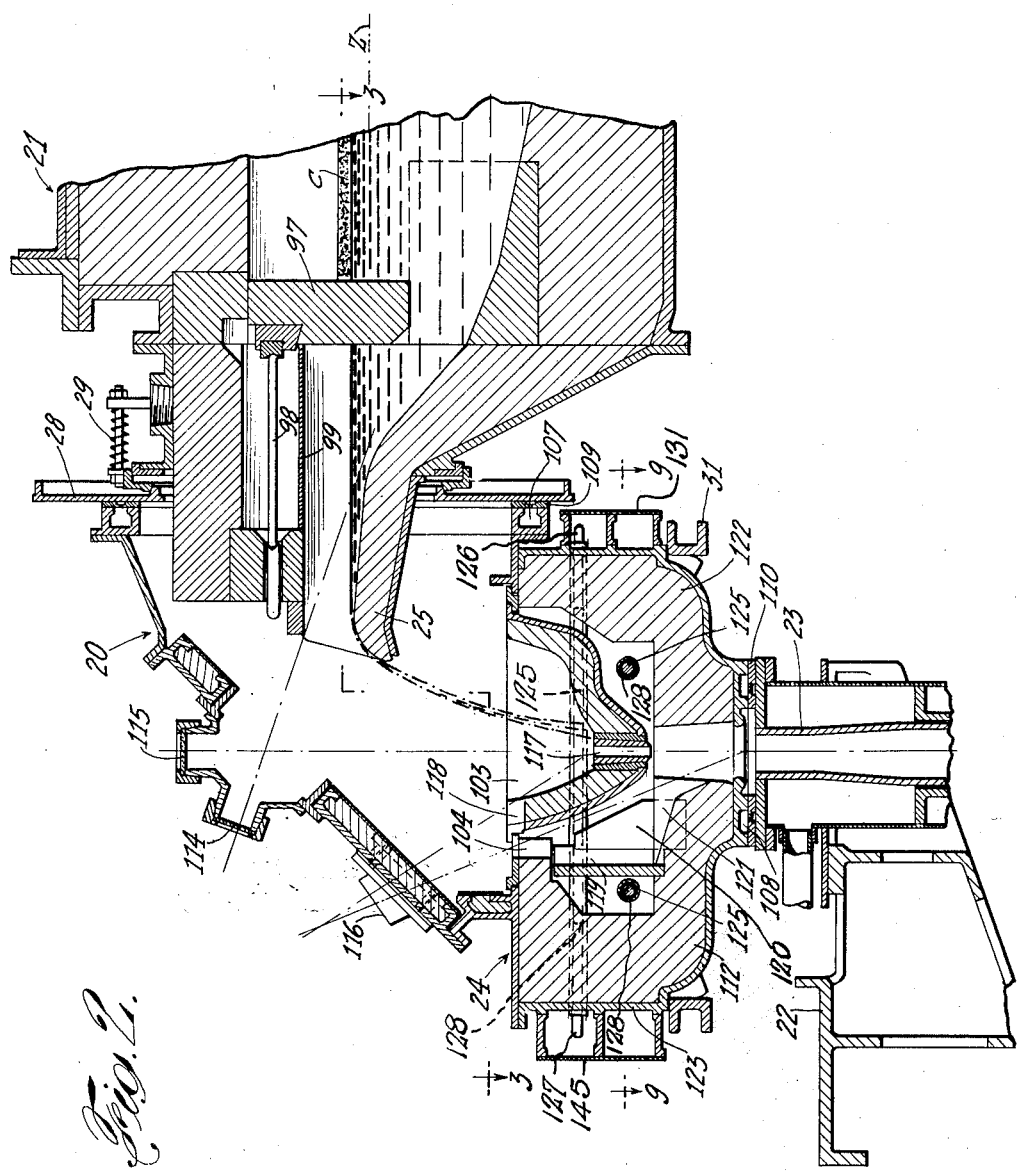

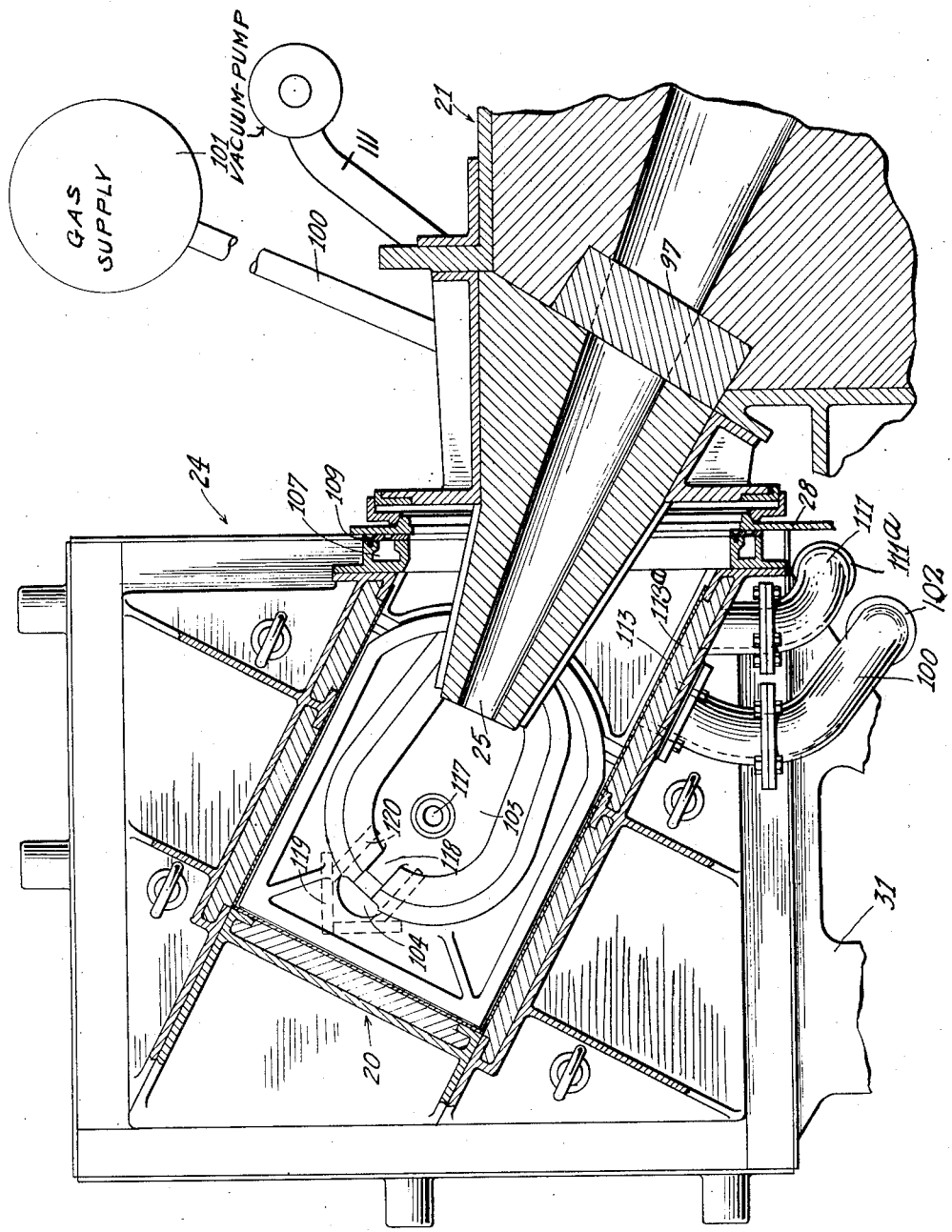

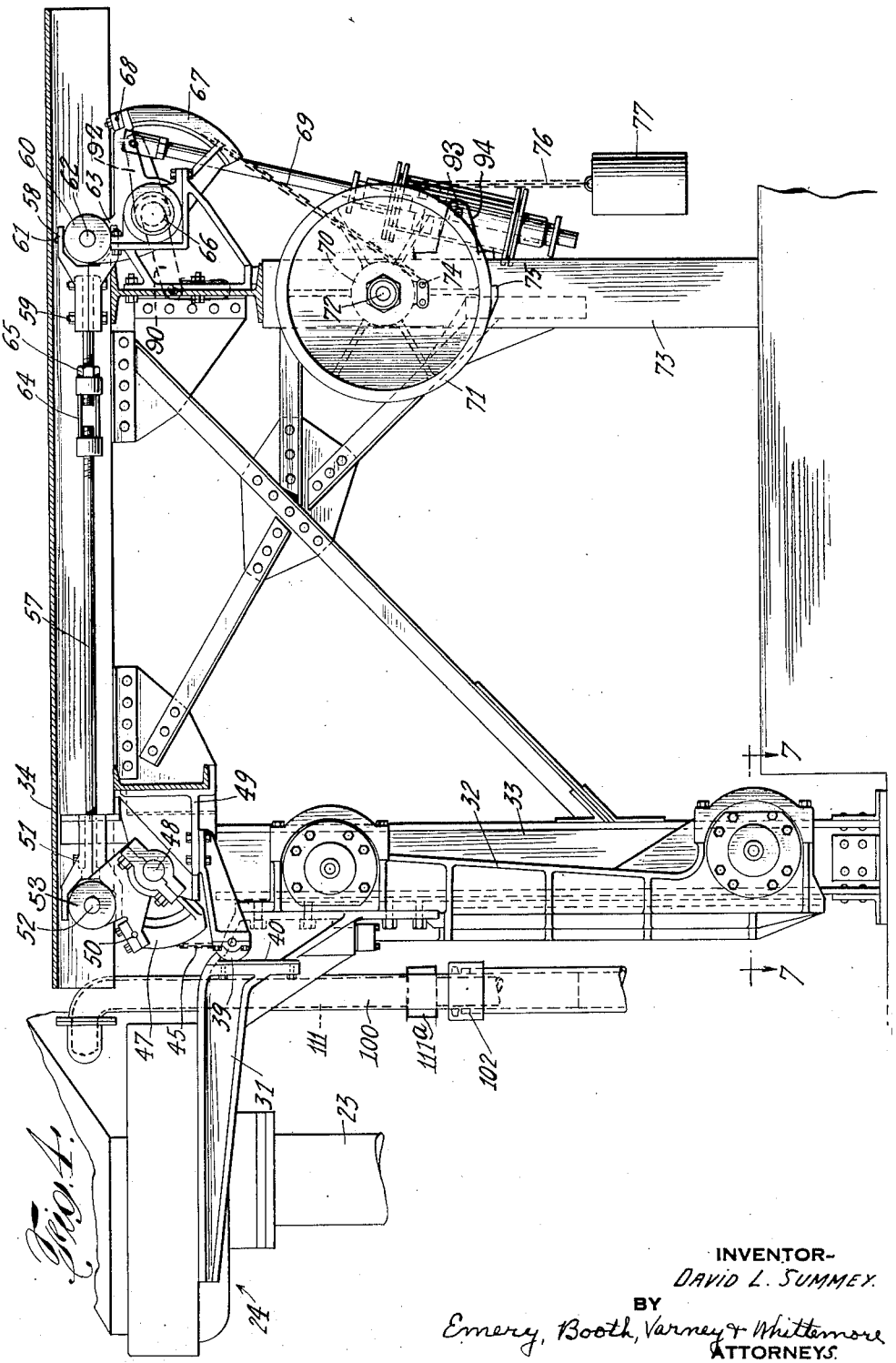

Nov. 10, 1936.   D. L. SUMMEY   2,060,135
METALLURGICAL APPARATUS
Original Filed April 29, 1932   10 Sheets-Sheet 5
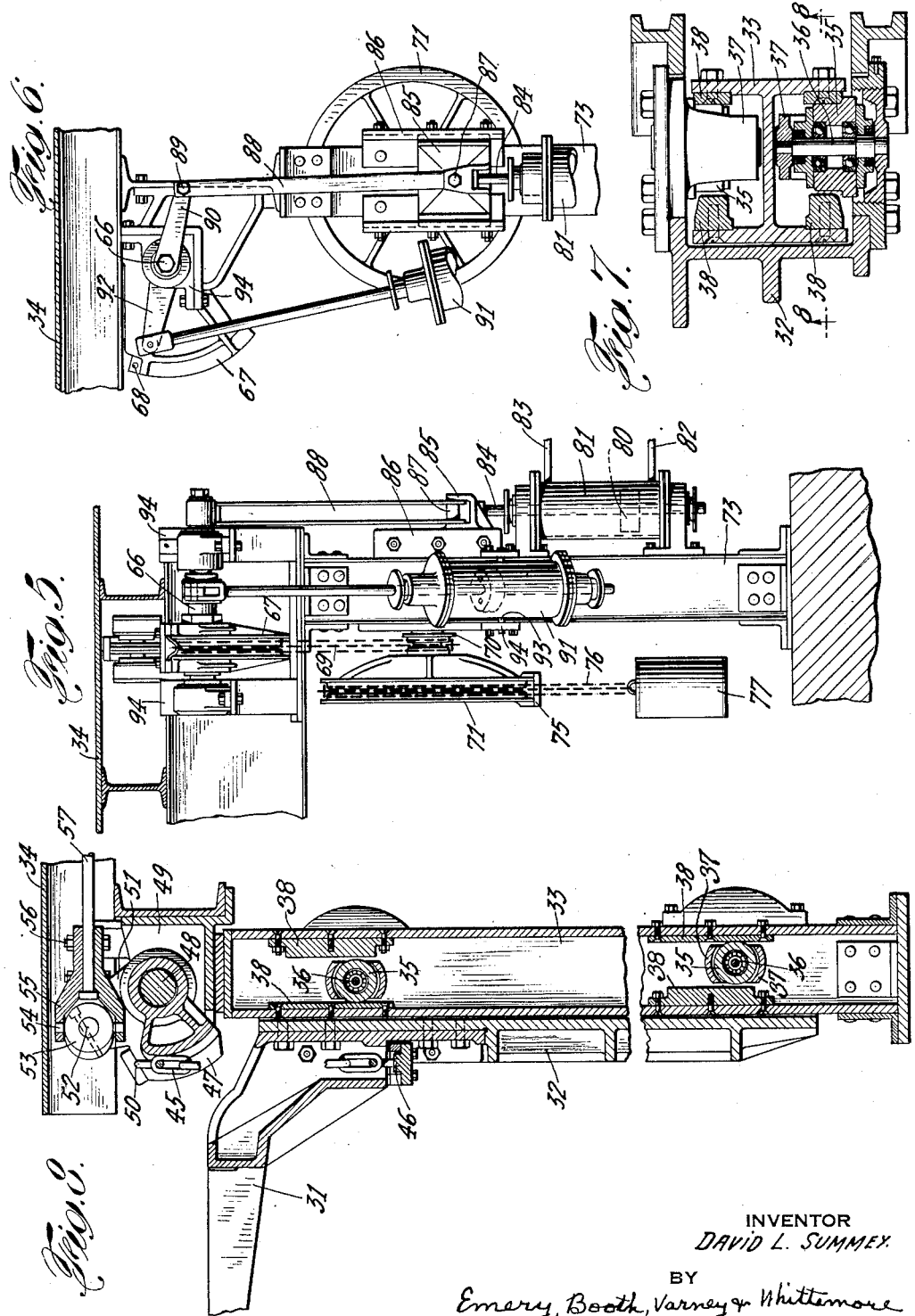
INVENTOR
DAVID L. SUMMEY.
BY
Emery, Booth, Varney & Whittemore
ATTORNEYS

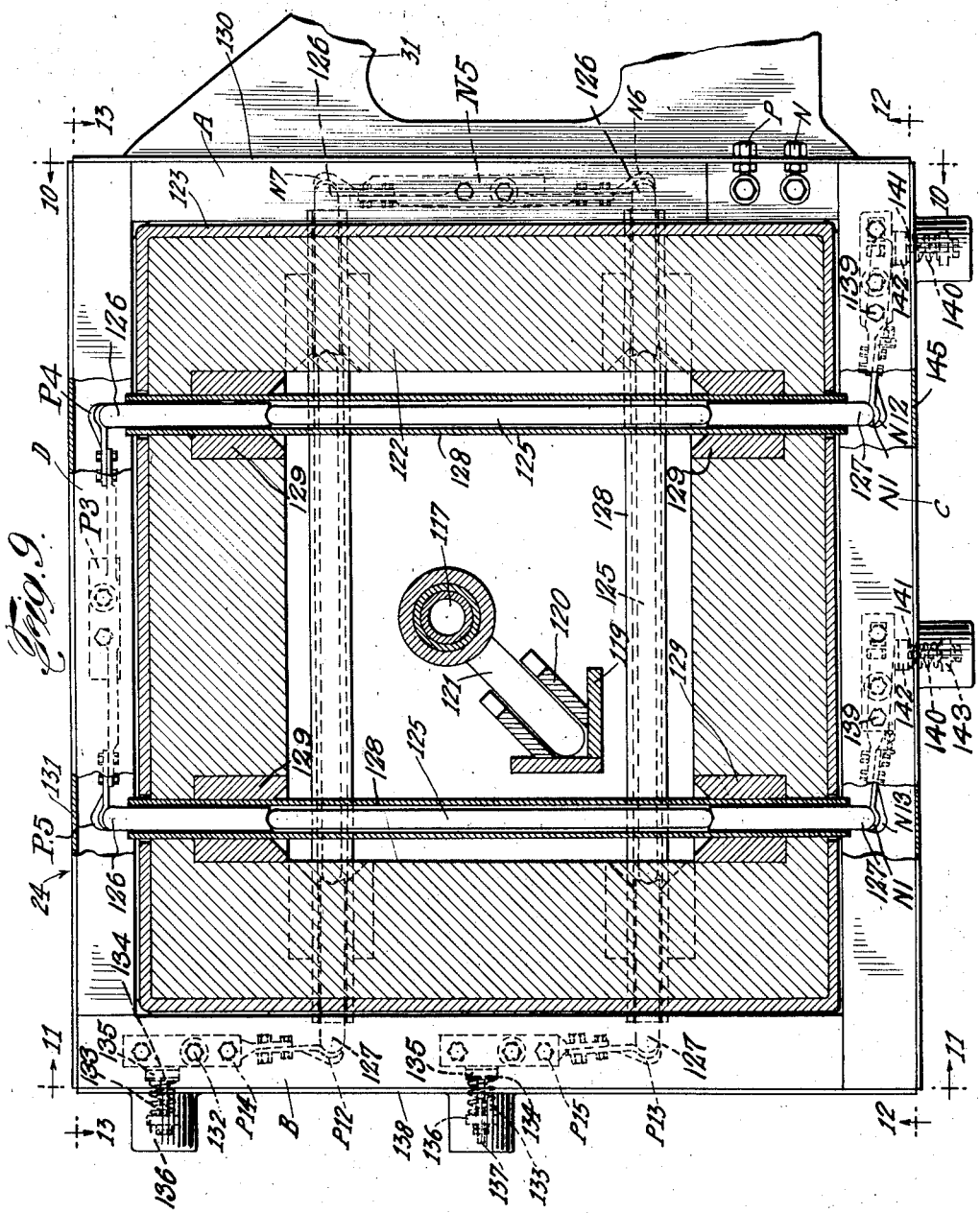

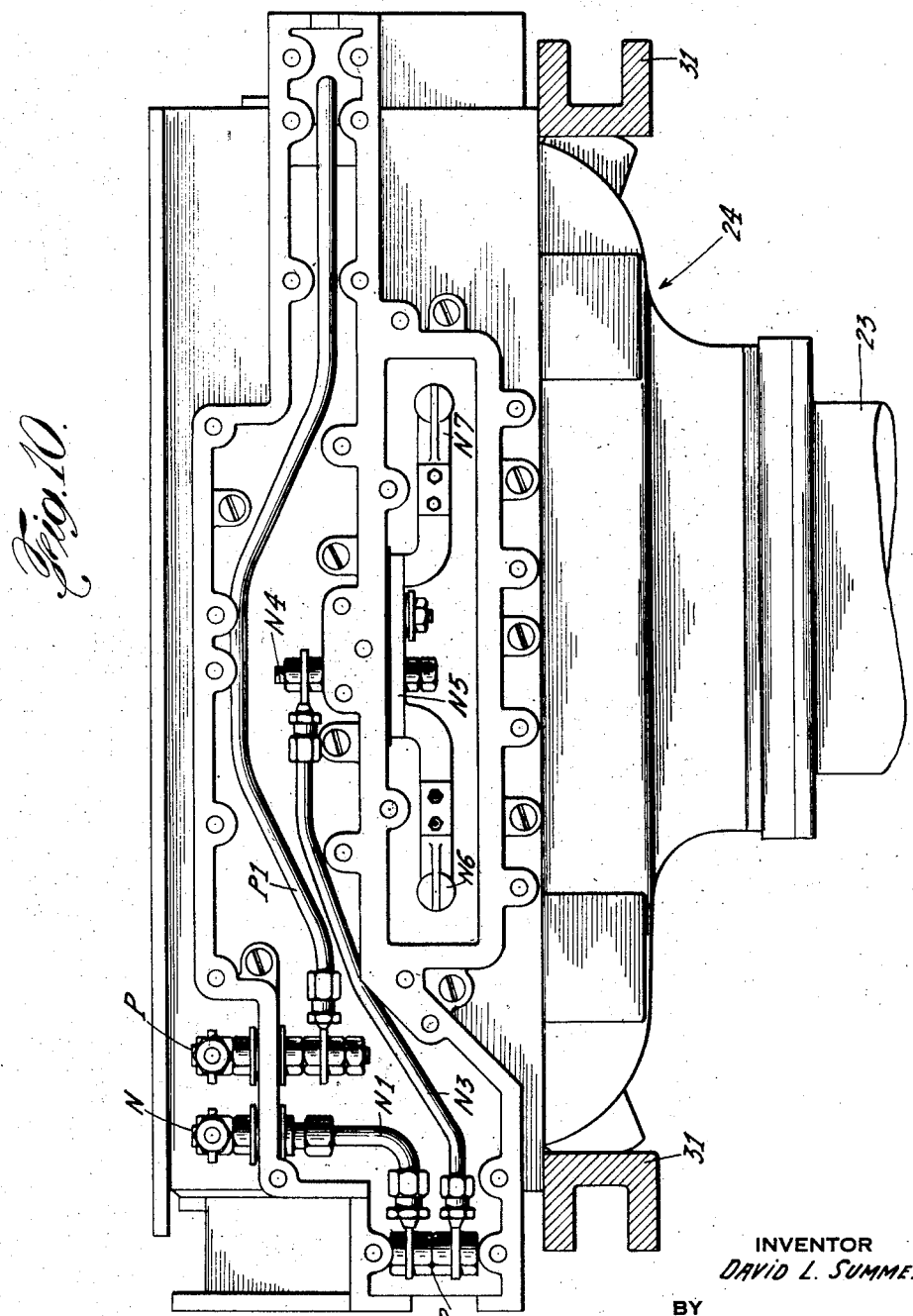

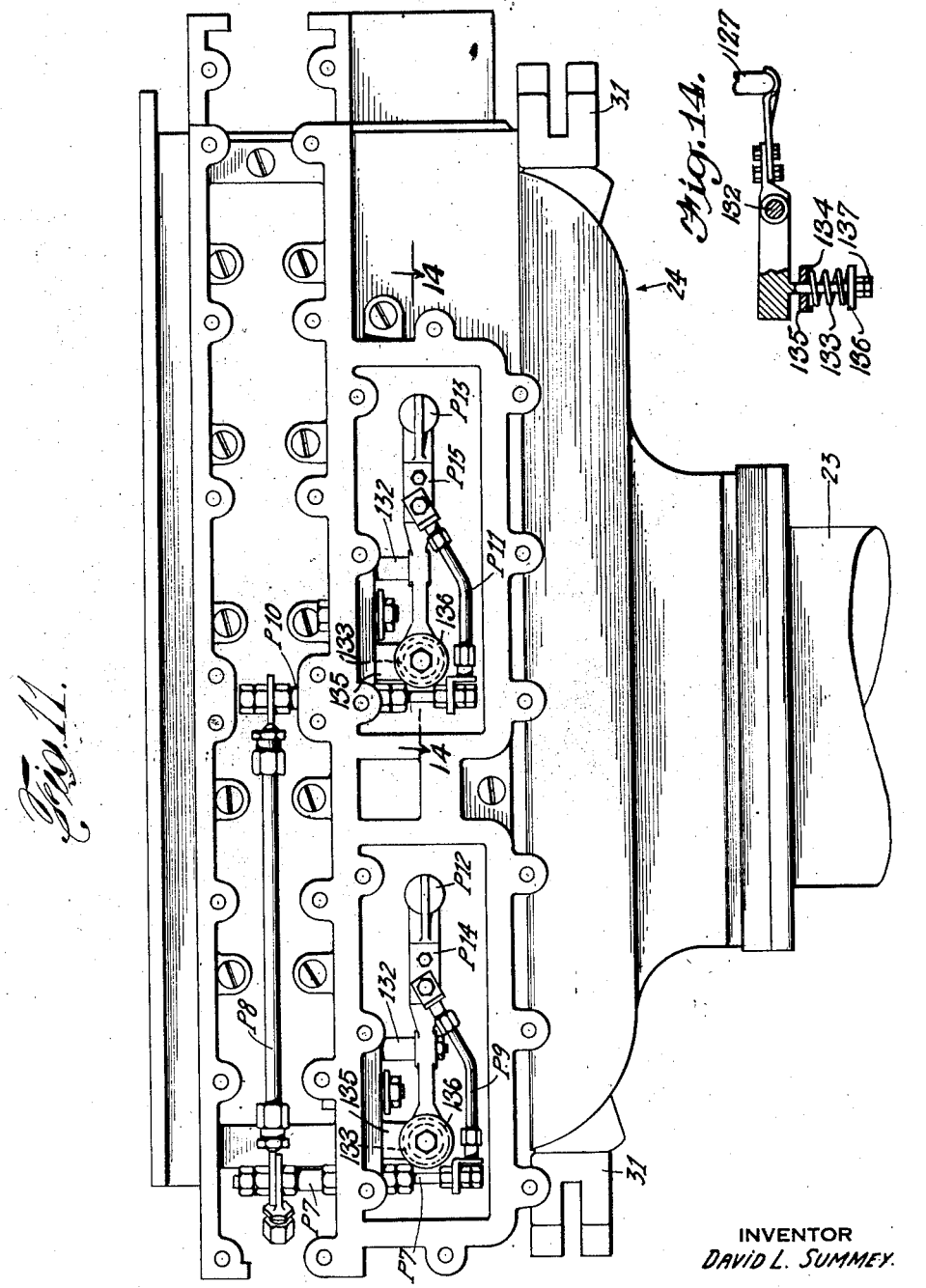

Nov. 10, 1936.　　　D. L. SUMMEY　　　2,060,135
METALLURGICAL APPARATUS
Original Filed April 29, 1932　　10 Sheets-Sheet 9
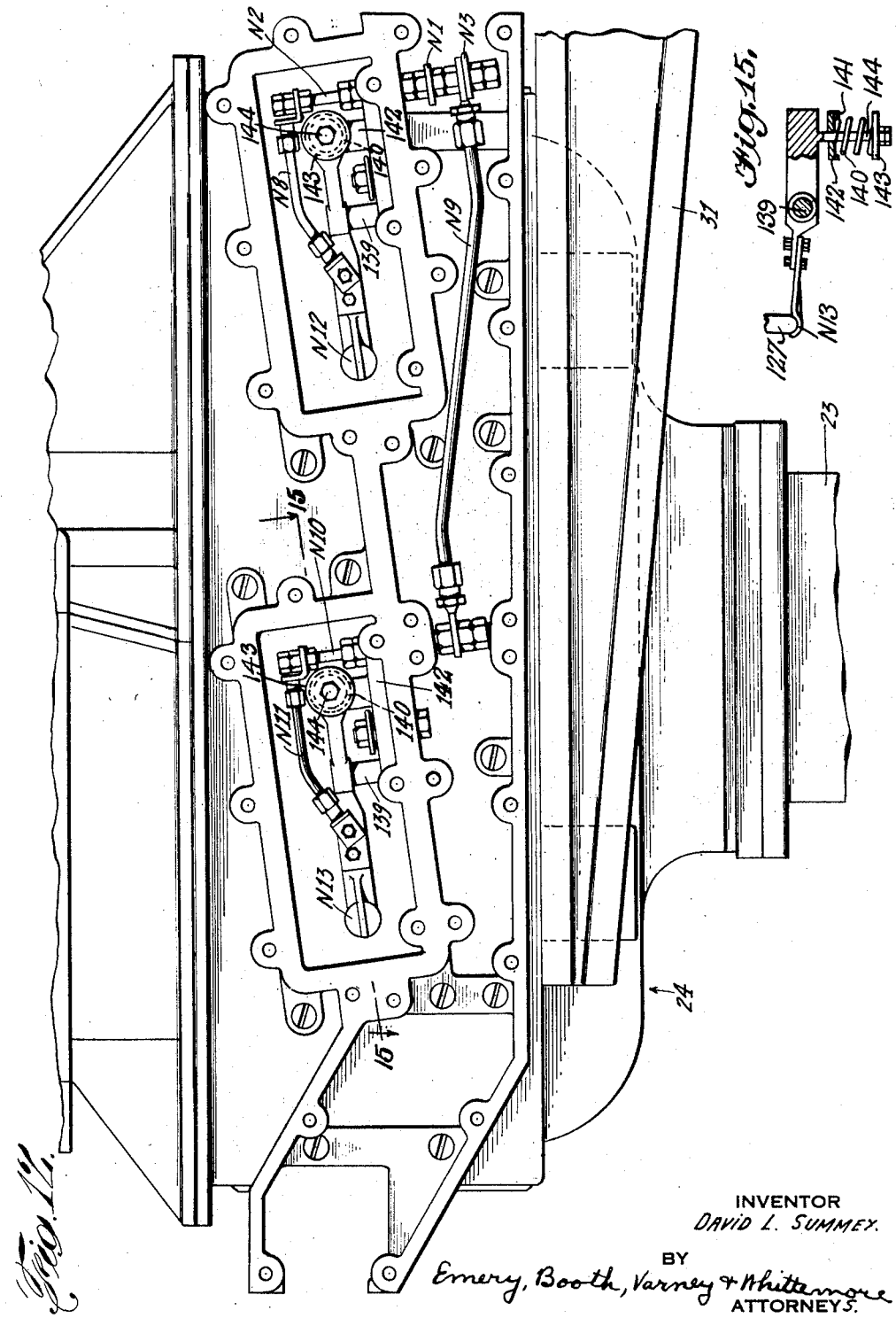
INVENTOR
DAVID L. SUMMEY.
BY
Emery, Booth, Varney & Whittemore
ATTORNEYS.

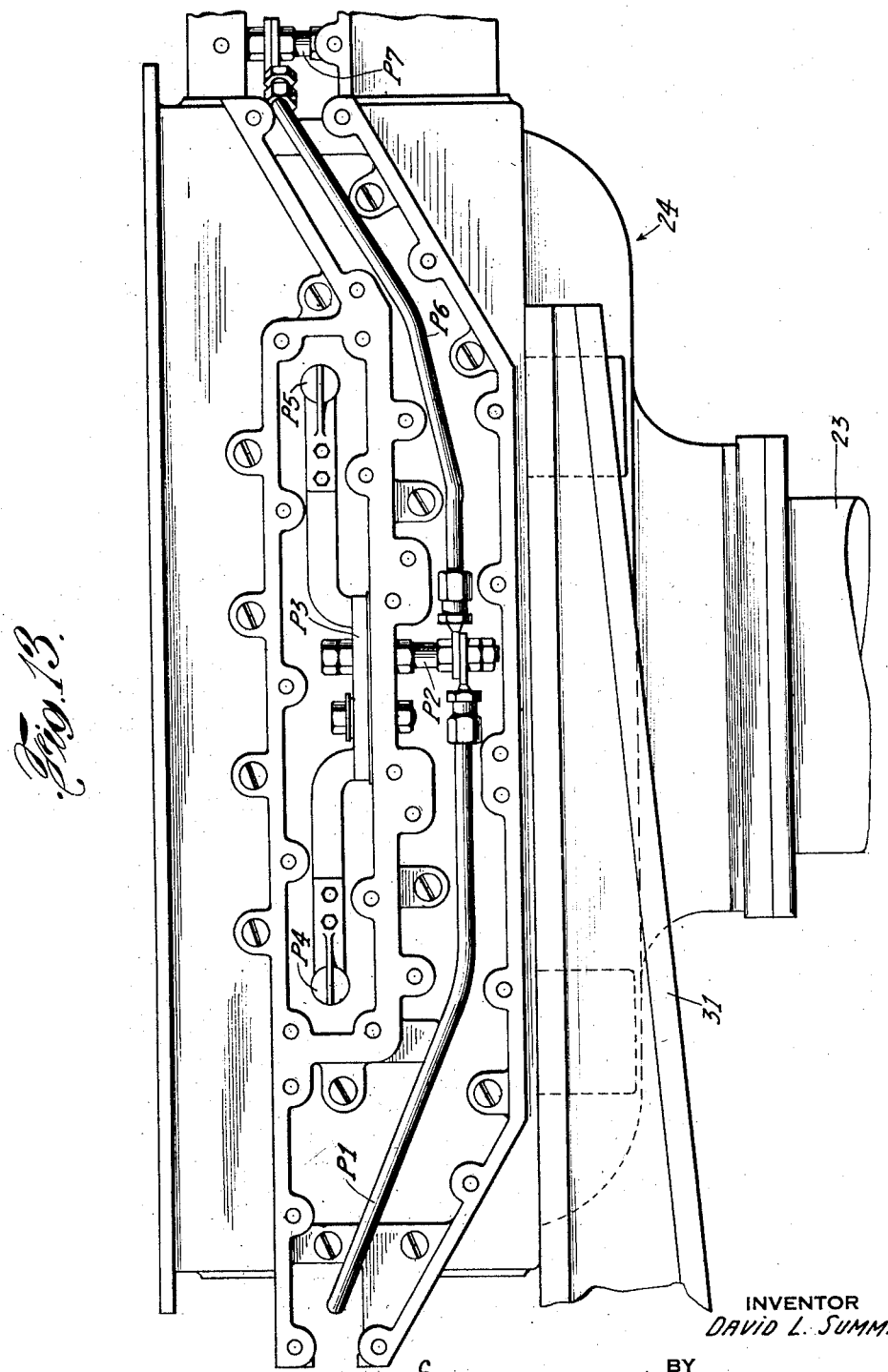

Patented Nov. 10, 1936

2,060,135

UNITED STATES PATENT OFFICE

2,060,135

METALLURGICAL APPARATUS

David L. Summey, Waterbury, Conn.; The Colonial Trust Company and Richard P. Weeks Summey, executors of said David L. Summey, deceased, assignors to Scovill Manufacturing Company, Waterbury, Conn., a corporation of Connecticut Application April 29, 1932, Serial No. 608,177
Renewed July 21, 1934

28 Claims. (Cl. 22—79)

This invention relates to metallurgical apparatus, particularly to aparatus for confining, heating and directing molten metal in its flow between a source of supply, for example a melting furnace, and a receptacle, for example a mold in which the metal is solidified. The furnace has movement during pouring operations and the molds are shifted along as they are filled. There must therefore be relative movement between the parts. This relative movement may be accommodated in various ways. Herein it is accommodated by movement of the interconnecting means which directs the metal into the molds. This means has vertical movement whereby it can be raised from molds as they are filled and be lowered upon others as they successively come into position therebeneath. At the same time a sealed connection is maintained with the furnace which permits of the vertical movements of the metal directing means and the movements of the furnace for pouring.

It is one object of this invention to provide improved enclosing means which will adjust itself to the furnace and molds and a further object to provide improved metal directing and heating means, which latter means may form a part of or be intimately associated with the first means.

Fig. 1 is a plan view of the present apparatus together with certain related apparatus with which it is associated;

Fig. 2 is a vertical section taken on the line 2—2 of Fig. 1;

Fig. 3 is a horizontal section taken on the line 3—3 of Fig. 2;

Fig. 4 is a vertical section taken on the line 4—4 of Fig. 1;

Fig. 5 is a side elevation taken on the line 5—5 of Fig. 1;

Fig. 6 is an end elevation taken on the line 6—6 of Fig. 1;

Fig. 7 is a horizontal section taken on the line 7—7 of Fig. 4;

Fig. 8 is a vertical section taken on the line 8—8 of Fig. 7;

Fig. 9 is a horizontal section taken on the line 9—9 of Fig. 2;

Fig. 10 is a vertical section taken on the line 10—10 of Fig. 9;

Fig. 11 is a vertical section taken on the line 11—11 of Fig. 9;

Fig. 12 is a vertical section taken on the line 12—12 of Fig. 9;

Fig. 13 is a vertical section taken on the line 13—13 of Fig. 9;

Fig. 14 is a horizontal section taken on the line 14—14 of Fig. 11; and

Fig. 15 is a horizontal section taken on the line 15—15 of Fig. 12.

In the present embodiment of the invention the pouring enclosure 20 (Fig. 1) is shown in association with a cylindrical pouring furnace 21 which tilts about a horizontal axis Z and a mold wheel 22 which supports a plurality of molds 23. The metallurgical plant which comprises these units is described in my application Serial Number 619,474 filed June 27, 1932, and the method of operating the plant to produce cast metal, for example copper, of a high quality is described in my application Serial Number 535,829, filed May 8, 1931.

As shown in Fig. 2, there is associated with the enclosure 20 a device 24, hereinafter referred to as a strainer for directing a stream of molten metal from the spout 25 of the furnace 21 into the mold 23. Narrow vertical molds are employed, these having been found to produce the soundest possible castings with least head scrap loss. In order to obtain such sound castings even with vertical molds the pouring procedure must be carefully controlled. It is inadvisable to attempt to pour directly from the furnace into the molds. It is preferable to pour from a device which will cause the metal to descend in a vertical stream into the mold. The strainer fulfills this purpose. It is provided with a pour hole 117. For best results this hole is so formed that its length is several times greater than its diameter. Herein the strainer 24 and the cooperating enclosure 20 are rigidly and tightly secured together and have vertical movement in order to cooperate with the molds which have no vertical movement.

The vertical movements of the enclosure and the rocking movements of the furnace are accommodated in what may be termed an articulated joint which maintains a tight seal about the spout in all positions of either the enclosure or the furnace. This joint comprises (Fig. 2) a plate 28 which has a large flat face in engagement with a flat face on the end of the enclosure. The plate is resiliently urged against the enclosure by springs 29 and is sealed in any suitable manner about the spout 25 so as to have adjustable movement thereon.

Suitable means are provided for raising and lowering the strainer and enclosure assembly as required. As shown in Fig. 4, the strainer is supported by a forked bracket 31 which is attached to a vertically movable slide 32. The slide 32 is supported upon a vertical I-beam column 33 which forms part of the support for a platform 34. The connection between the slide 32 and the column, as shown in Figs. 7 and 8, comprises rollers 35 mounted on shafts 36 on opposite sides of the column. The inner ends of the shafts are supported by U-shaped anchor members 37. The rollers operate upon smooth faced guides 38 which are attached interiorly to the flanges of the I-beam column 33. Referring to Fig. 4, an auxiliary roller 39 is secured to a fixed part attached to the top of the column 33 and at one side of the latter to cooperate with a guide 40 secured to the vertical slide 32. This prevents twisting movement of the strainer and enclosure about a vertical axis due to the action of the springs 29 acting upon the sealing plate 28.

Referring to Fig. 8 the slide 32 is supported by a flexible member such as a chain 45 which is anchored in the strainer supporting bracket 31 by a clip 46. The chain 45 passes over an arcuate flanged sector 47 rotatable upon or with a shaft 48 which is supported in a frame member 49 resting upon the top of the column 33. The chain is anchored to the segment by a clip 50.

The sector 47 is formed integral with, or through the shaft 48 is rigidly connected with, a bifurcated crank arm 51. To the divided ends of the arm a crank 52 is secured. Upon this is rotatably mounted a sleeve 53 which bears opposed stud pins 54. A yoke 55 is connected to these stud pins 54 and to this yoke there is clamped by bolts 56 a connecting rod 57.

As seen in Fig. 4, the connecting rod 57 extends rearwardly to operating mechanism of a suitable character. The illustrated embodiment of this mechanism comprises a connection similar to that just described, including the yoke 58, clamp bolts 59, sleeve 60 with stud pins 61, crank pin 62 and the bifurcated crank arm 63. The connecting rod may be adjusted in length by a coupling 64 which includes the lock nut 65.

The arm 63 is formed integral with, or is rigidly connected through the power shaft 66 with, a flanged sector 67 to which is attached as by a clip 68, a flexible member or chain 69. The chain 69 extends downward to the grooved hub 70 of a flanged wheel 71 which is rotatably mounted on a stub shaft 72 anchored to a vertical column 73. The chain is anchored to the hub 70 by a clip 74.

To the flanged wheel 71 there is attached as by a clip 75, a flexible member such as a chain 76 which passes over the wheel and suspends a counterweight 77. The counterweight may be made lighter than the strainer and enclosure which it partly balances, assuming that the strainer is to move downward by gravity and is to be moved upward by power, due to the fact that the mechanical advantage through the small hub 70 and the large wheel 71 is in favor of the counterweight.

The shaft 66 is operated to raise the strainer assembly by a fluid actuated piston 80 (Figs. 5 and 6) disposed in a cylinder 81 which is anchored to the column 73 and supplied with fluid through pipes 82, 83. The piston rod 84 is attached to a cross-head slide 85 which is operable in guides 86, attached to the column 73. The crosshead is attached by a wrist pin 87 to a connecting rod 88, which rod is attached by a crank pin 89 to a power crank arm 90 rigidly connected to the shaft 66.

The strainer must be moved very carefully or it is likely to cause damage. Accordingly the movement is regulated by a fluid dash pot 91 which is operatively connected to the shaft 66 by a dash pot arm 92 fast upon the shaft. The cylinder of the dash pot is pivoted by stub shafts 93 upon brackets 94 which are attached to the column 73.

When, as shown in Fig. 2, metal is disposed in the furnace 21 the furnace chamber is sealed off from the spout 25 by a baffle or skimmer 97 which extends downward toward the inner end of the spout. If a covering, for example carbon C, lies upon the metal in the chamber it is kept from passing out the spout by the baffle. The metal confined in the spout by the baffle may be kept molten by electrical resistor heaters 98 disposed thereabove. A refractory plate 99 prevents injury to the resistors by splashing metal.

Means are provided for preventing the entry of atmospheric air into the enclosure 20. The oxygen of the air would be extremely harmful to the quality of the metal. In order to produce sound copper castings, for example, all oxygen must be kept away from the metal until it solidifies. The air may best be excluded by introducing a non-oxidizing or deoxidizing gas into the enclosure under a pressure which is above atmospheric pressure. If there should then be any leakage the gas will flow outward. The air cannot flow inward. The gas may be introduced by a pipe 100 which enters the enclosure 20 on one side (Fig. 3) and which leads to a gas producer 101. Carbon monoxide with perhaps an intermixture of some inert or non-oxidizing gases is preferred. The pipe 100 (Fig. 4) is provided with a slip joint 102 to accommodate the vertical movements of the enclosure and strainer.

Some of the gas may be by-passed around the strainer basin 103 by an aperture 104 into the mold to expel all air from the mold before metal is poured therein.

The connecting joints of the enclosure with the furnace and the mold are sufficiently tight to limit the flow of gas therethrough to a small amount. If there should be objections to even this small leakage it may be avoided by means which are hereby provided. The joints include members provided with annular recesses 107 and 108 at the furnace and mold respectively and these recesses are covered by apertured plates 109, 110 respectively which form the engaging parts of the joints. A vacuum pipe 111 connected with the annular spaces takes the escaping gases away. The vacuum pipe is provided with a slip joint 111a like that described for the gas pipe 100 for accommodating the vertical movements of the strainer and enclosure. The pipe 111 connects with the annular spaces 107, 108 respectively, by a space or duct (not shown). A vacuum is maintained on the pipe by a vacuum pump 111b. The space between the main shell of the enclosure and the interior lining plates 113 is filled with a refractory material 113a (Fig. 3).

It is desirable for operators to approach in order that they may observe the flow and condition of the metal within the enclosed apparatus. For making such observations possible, sight openings 114, 115, 116 covered by glass or the like are provided to give a view into the furnace, into the strainer (and into the mold when metal does not obstruct the pour hole 117 of the strainer), and into the strainer and the top of the mold respectively. The aperture 104 past the strainer bowl is employed for the last sighting. The lines of sight are indicated in Fig. 2.

It is important that the operator be able to see within the strainer and the mold through one sight opening such as 116 for by this arrangement he can tell the amount of metal in the strainer relative to the rate of pouring through the strainer and relative to the amount of metal in the mold; can pour metal from the furnace at the proper rate to produce the best castings; and can avoid overfilling the mold. Much time is lost in clearing away frozen metal if it is allowed to spill. The sight opening 115 is important since it enables the operator to see the condition of the pour hole 117 of the strainer before beginning to pour. The sight opening 114 is important since it enables the operator to observe the level of the metal in the furnace and to tilt the furnace accordingly so as not to start pouring either too slowly or too rapidly and to keep the metal from spilling over the edge of the spout when not pouring.

The pour hole 117 includes a refractory tube which is set into the strainer lining and metal casing. The tube is tapered interiorly to receive a replaceable inner tube which may be removed by driving it upward.

As shown in Figs. 2, 3, and 9, the aperture 104 may also serve for the overflow of metal if the pour hole 117 should become plugged or if it should not take metal away as fast as it is poured from the furnace into the strainer. An overflow notch 118 is made in the upper edge of the strainer basin and surplus metal escaping thereby is confined by converging vertical plates 119 and parallel vertical plates 120. A groove 121 in the outer refractory lining 112 of the strainer directs the overflow metal into the mold.

Means are provided for keeping the metal molten in the enclosure, particularly in the basin of the strainer. This heating means is disposed about the pouring hole of the basin in a protected position. In the present embodiment it comprises (Figs. 2 and 9) a plurality of resistor rods 125 of a refractory material such as silicon carbide which are engaged by substantially stationary electrodes 126 and movable electrodes 127. There are four resistors in the present instance forming a complete enclosure about the strainer basin. The resistors are, as mentioned above, placed in a protected position but in order further to protect them from splashing metal they are encased by refractory, for example alundum, sleeves 128. The sleeves 128 extend through the lining 122 and the shell 123 of the strainer and partly encase the electrodes 126 and 127 as well as the resistors 125. Refractory blocks 129 are preferably set into the lining 122 at the ends of the resistors. Better alignment and freer movement of the electrodes is secured in this manner.

The resistors are arranged in pairs, each pair at a different elevation in order to obtain the most convenient disposition of them and in order to avoid interference by one set or pair with the other set.

Elevational views of the resistor arrangement and of the electrical connections therefor are shown in Figs. 10 to 13, the views being taken with reference to Fig. 9. For convenient reference the elevations of Figs. 10, 11, 12, and 13 will be designated as sides A, B, C, and D respectively. Referring to Fig. 10, the resistors are supplied with current from an outside source through the power terminals N, P. Conductors N1, P1 are connected to these terminals. The first N1 supplies current to the parts shown in Figs. 10 and 12 and the other P1 supplies current to the parts shown in Figs. 11 and 13. The conductor N1 is attached to a terminal post N2 and through this supplies current to a conductor N3 which is connected to a bracket post N4 for the double bracket N5. At each end the bracket N5 is provided with detachable cupped electrode supports N6, N7. The side is closed by a suitable cover or covers 130 (Fig. 9). The covers for this and the other sides not only protect the electrodes and connections from injury and protect the operators from injury by contact with the electrodes, but are sealed tightly to the casing so as to prevent escape of gas from the casing or the inflow of air into the casing. This passage of gases might otherwise occur due to the looseness of the joints about the electrodes and the sleeves therefor and the porosity of the sleeves. The outward leakage of carbon-monoxide at this location would be particularly undesirable because operators must be present to supervise the pouring operations.

Referring to Fig. 13 which shows the connections for the fixed ends of the other resistors (side D), the conductor P1 extends around the corner to the bracket post P2 for the double bracket P3. Removable cupped supports P4, P5 on the bracket P3 back up the electrodes. A conductor P6 extends to a connector post P7. A cover 131 in one or several parts encloses these electrical connections on side D.

Referring to Fig. 11 which shows the connections for the resiliently pressed electrodes for one pair of resistors (side B), the post P7 has connected thereto at its upper and lower ends respectively two conductors P8, P9. The former P8 is connected to a terminal post P10 and from this extends a conductor P11. The conductors P9 and P11 are respectively connected to replaceable cupped electrode supports P12, P13 which are mounted upon swinging levers P14, P15. The levers are supported upon studs 132 and are urged against the electrodes by compression springs 133 (Fig. 9) which act between seats 134 formed on fixed brackets 135 and seats 136 adjustably attached to bolts 137 which are pivotally connected with the outer ends of the levers. The parts on this side are protected by a cover 138. The bolts 137 pass through the brackets 135 as shown in Fig. 14.

Referring to Fig. 12 which shows the connections for the resiliently pressed electrodes for the other pair of resistors (side C), the post N2 has connected thereto at its upper and lower ends respectively two conductors N8, N9. The latter is connected to a terminal post N10 and to this post is connected a conductor N11. The conductors N8 and N11 are respectively connected to replaceable cupped electrode supports N12, N13 which are mounted upon swinging levers N14, N15. The levers are supported upon studs 139 and are urged against the electrodes by compression springs 140 which act between seats 141 formed on fixed brackets 142 and seats 143 adjustably attached to bolts 144 which are pivotally connected with the outer ends of the levers. The parts on this side are protected by a cover 145.

In operation the strainer and hood assembly is lifted after a mold is filled and lowered after an empty mold has been brought into position. This movement is wholly independent of the movement of the furnace. After the strainer has been seated on the mold the gas which is continually being supplied to the hood is allowed to flow through the mold to purge it of air. The bottom of the mold is then closed and the metal poured by tilting the hearth. The tilting of the hearth is independent of the movement of the strainer and hood. The metal is at all times kept enclosed and enveloped by a gas which excludes air from it.

The advantages of the apparatus will be apparent from the above description of one exemplary embodiment thereof. It is to be understood that the invention may have other embodiments and may be variously modified within the scope of the subjoined claims.

I claim:

1. Apparatus of the character described comprising in combination, a strainer bowl, an enclosure therefor which on the sides is spaced therefrom, rod-shaped electrical resistor heaters within the space around the bowl, refractory lining at the ends of said resistors, stationary electrodes for one end of said resistors extending through the lining, fixed arms parallel with the side of the enclosure engaging and backing said stationary electrodes, movable electrodes for the other end of said resistors extending through the lining, movable levers parallel with the side of the enclosure engaging and resiliently pressing said movable electrodes, and resilient means engaging said movable levers for pressing them against the electrodes.

2. Apparatus as set forth in claim 1 in which said movable levers are pivoted at a mid-point, a headed rod attached to the free end of the lever, a bracket between the head of the rod and the lever, and a compression spring positioned between the head and the bracket pressing the free end of the lever outward and the electrode-engaging end of the lever inward.

3. Apparatus as set forth in claim 1 in which said movable levers and said arms are provided with detachable cupped ends engaging the electrodes.

4. Apparatus as set forth in claim 1 which further includes boxing and covers for the mechanism and conductors at the ends of said electrodes.

5. Apparatus of the character described comprising in combination, a strainer bowl for directing molten metal, an enclosure therefor, and a plurality of rod-shaped resistor heaters disposed about said bowl, said resistors being arranged crosswise at different elevations.

6. Apparatus of the character described comprising in combination, a strainer assembly, a channelled column supporting said assembly, guides disposed within the channels of said column, a frame supporting said assembly, and rollers on said frame engaging said guides for accommodating the vertical movement of said frame.

7. Apparatus as set forth in claim 6 which further includes means pressing said assembly sidewise, an auxiliary guide on said frame and a roller mounted on said column cooperating with said auxiliary guide to resist said sidewise movement.

8. Apparatus of the character described comprising in combination, a strainer assembly, means supporting said assembly for vertical reciprocation, guide means therefor, means pressing the assembly sidewise, and an auxiliary guide resisting the sidewise movement of the assembly.

9. Apparatus for pouring metal, comprising in combination, a device for pouring molten metal, a device spaced therefrom for receiving molten metal, a hood for protecting metal between the pouring and receiving devices, contact joints between said hood and devices and means for forming a vacuum at said joints, said means comprising a recess following the perimeter of said joint, a perforated plate covering said recess, and means for evacuating said recess.

10. Apparatus for pouring metal, comprising in combination, a device for pouring molten metal, a device spaced therefrom for receiving molten metal, a hood for protecting metal between the pouring and receiving devices, contact joints between said hood and devices and means for forming a vacuum at said joints, said means comprising a recess following the perimeter of contact of said joints and means for evacuating said recess.

11. Apparatus for pouring metal, comprising in combination, a device for pouring molten metal, a device spaced therefrom for receiving molten metal, a hood for protecting metal between the pouring and receiving devices, contact joints between said hood and devices and means for forming a vacuum at said joints.

12. Apparatus for pouring metal, comprising in combination, a device for pouring molten metal, a device spaced therefrom for receiving molten metal, a movable hood for protecting metal between the pouring and receiving devices, contact joints between said hood and devices and means for forming a vacuum at said joints, said means comprising a recess following the perimeter of said joint, a perforated plate covering said recess, a pipe for evacuating said recess and a joint in said pipe accommodating the movement of said hood.

13. Apparatus of the character described comprising in combination, a strainer bowl for directing molten metal into a receiving vessel, an enclosure for said bowl, rod-shaped electrical resistors positioned across said enclosure outside of said bowl, and a refractory tube enclosing each of said resistors for protecting them against splashing metal.

14. Apparatus of the character described comprising in combination, a strainer bowl for directing molten metal into a receiving vessel, an enclosure for said bowl, a by-pass path for metal around said bowl, electrical resistors positioned around said bowl for keeping the metal molten therein, and refractory members protecting said resistors from molten metal.

15. Apparatus of the character described comprising in combination, a strainer bowl for directing molten metal into a receiving vessel, an enclosure for said bowl, a by-pass path for metal around said bowl, electrical resistors positioned around said bowl for keeping the metal molten therein, and refractory members protecting said resistors from molten metal, said refractory members including vertical plates positioned between the bowl and a resistor.

16. Apparatus of the character described comprising in combination, a strainer bowl for directing molten metal, a pouring opening in the bottom thereof, an enclosure for said bowl, and a by-pass for overflow metal from the bowl, said by-pass directing the metal to a point directly below said pouring opening, said by-pass including a notch in the upper edge of said bowl and refractory means forming a passage for receiving metal escaping from said notch.

17. Apparatus for pouring metal, comprising in combination, a device for supplying molten metal, a device for receiving molten metal, a hood for entirely enclosing the stream of metal between said supplying and said receiving device, said hood being adjustably sealed to said supplying device in all positions of the device and hood and being seated upon the upper end of a receiving device when the latter is positioned therebeneath, and means for vertically reciprocating said hood to seat it upon a receiving device or to raise it therefrom, said means comprising a pair of spaced parallel crankshafts, means for connecting one of the crankshafts to the hood, means for connecting the two crankshafts together, and power means for operating the second crankshaft.

18. Apparatus for pouring metal, comprising in combination, a device for supplying molten metal, a device for receiving molten metal, a hood for entirely enclosing the stream of metal between said supplying and said receiving device, said hood being adjustably sealed to said supplying device in all positions of the device and being seated upon the upper end of a receiving device when the latter is positioned therebeneath, and means for vertically reciprocating said hood to seat it upon a receiving device or to raise it therefrom, said means comprising a power piston for raising the hood, the hood being lowered by gravity, and a dash pot for regulating the movement of the hood in either direction.

19. Apparatus for pouring metal, comprising in combination, a device for supplying molten metal, a device for receiving molten metal, a hood for entirely enclosing the stream of metal between said supplying and said receiving device, said hood being adjustably sealed to said supplying device in all positions of the device and hood and being seated upon the upper end of a receiving device when the latter is positioned therebeneath and means for vertically reciprocating said hood to seat it upon a receiving device or to raise it therefrom, said means comprising a crank shaft, a pulley thereon, a flexible member passing over said pulley and supporting said hood, and power means for operating said crank shaft.

20. Apparatus for pouring metal, comprising in combination, a device for supplying molten metal, a device for receiving molten metal, a hood for entirely enclosing the stream of metal between said supplying and said receiving device, said hood being adjustably sealed to said supplying device in all positions of the device and hood and being seated upon the upper end of a receiving device when the latter is positioned therebeneath, and means for vertically reciprocating said hood to seat it upon a receiving device or to raise it therefrom, said means comprising a power piston for raising the hood, and a counterweight partly balancing the weight of the hood.

21. Apparatus for pouring molten metal comprising in combination, a metal melting furnace, a spout therefor, a mold for receiving molten metal, a strainer for receiving a stream of molten metal from said furnace when tilted and directing it vertically into said mold, a hood enclosing the metal stream between said furnace and the mold, and sight means in said hood giving a view into the furnace through said spout, into said strainer, into the mold through the strainer and into the mold past the strainer.

22. Apparatus of the character described, comprising in combination, a basin or vessel adapted to receive molten metal and having an opening for directing metal from the bottom thereof, a refractory tube surrounding said opening having a downwardly tapered inner surface, and a replaceable refractory sleeve fitting in said tube and adapted to be removed by upward movement.

23. Apparatus of the character described comprising in combination, a strainer bowl for directing molten metal into a receiving vessel, an enclosure for said bowl, and rod-shaped electrical resistors positioned across said enclosure outside of said bowl.

24. Apparatus of the character described, comprising in combination, a billet mold, a strainer bowl for holding a shallow pool of metal, an enclosure therefor excluding air from the metal both in the strainer and between the strainer and the mold, means for maintaining a gas within the enclosure for protecting the metal, and glass-covered sight openings in the enclosure giving a view into the bowl and below the bowl.

25. Apparatus for directing a stream of molten metal between a pouring device and a receiving device, comprising in combination, a strainer bowl having a heat-conducting refractory lining in the bottom of which is formed a hole for the passage of the metal to the receiving device, said hole being several times greater in length than in diameter, whereby the stream of metal is accurately directed in a compact column, and electrical resistor heating elements so positioned about the strainer bowl that the heat radiated therefrom is concentrated upon said metal-directing hole whereby the free and unobstructed passage of metal therethrough may be assured.

26. Apparatus as set forth in claim 25 which further comprises in combination, an enclosure movably connected to a metal pouring device and to a metal receiving device, the upper portion of said enclosure surrounding the stream flowing to the strainer bowl, the intermediate portion of said enclosure forming a support and housing both for said bowl and for the resistor heating elements, and the lower portion of said enclosure surrounding the stream flowing from said bowl.

27. Apparatus as set forth in claim 25, which further comprises in combination, an enclosure connected at the time of pouring to a metal pouring device and to a metal receiving device and adapted to surround the molten metal as it flows into the strainer bowl, while it is in the strainer bowl and as it flows from said bowl, and means to supply to and maintain within said enclosure at the time of pouring a body of non-oxidizing gas at super-atmospheric pressure whereby completely to prevent the ingress of air.

28. Apparatus of the character described comprising in combination, a bottom-pour strainer bowl for directing molten metal into a receiving device, an enclosure for said bowl, said enclosure including supporting means for said strainer bowl and means comprising part of the enclosure forming a space around and below the strainer, and heating means disposed in said space.

DAVID L. SUMMEY.